(12) United States Patent　　(10) Patent No.: US 12,056,283 B1
Pounders et al.　　(45) Date of Patent: Aug. 6, 2024

(54) FEEDBACK CAPTURE AND RELAY

(71) Applicant: MB Technologies LLC, Sanford, NC (US)

(72) Inventors: John Pounders, Sanford, NC (US); Andrew Johnson, Florence, AL (US)

(73) Assignee: MB Technologies LLC, Santa Fe, NM (US)

( * ) Notice: Subject to any disclaimer, the term of this patent is extended or adjusted under 35 U.S.C. 154(b) by 0 days.

(21) Appl. No.: 18/518,301

(22) Filed: Nov. 22, 2023

Related U.S. Application Data

(60) Provisional application No. 63/521,195, filed on Jun. 15, 2023, provisional application No. 63/448,027, filed on Feb. 24, 2023, provisional application No. 63/529,575, filed on Jul. 28, 2023.

(51) Int. Cl.
| | |
|---|---|
| *A61F 2/32* | (2006.01) |
| *A63F 13/211* | (2014.01) |
| *A63F 13/235* | (2014.01) |
| *G06F 3/01* | (2006.01) |
| *H04L 67/12* | (2022.01) |

(52) U.S. Cl.
CPC ............ *G06F 3/016* (2013.01); *A63F 13/211* (2014.09); *A63F 13/235* (2014.09); *H04L 67/12* (2013.01)

(58) Field of Classification Search
CPC ...... G06F 3/016; A63F 13/211; A63F 13/235; H04L 67/12
See application file for complete search history.

(56) References Cited

U.S. PATENT DOCUMENTS

| | | |
|---|---|---|
| 9,615,994 B2 | 4/2017 | Sedic |
| 9,762,515 B1 | 9/2017 | Olivares et al. |
| 2006/0282170 A1* | 12/2006 | Hardwick ............... G06F 3/011 623/22.3 |
| 2009/0153350 A1* | 6/2009 | Steger ................. A63B 71/0686 340/407.1 |
| 2015/0366748 A1* | 12/2015 | Cambridge ............ A61H 19/32 600/38 |

FOREIGN PATENT DOCUMENTS

CN　WO 2014127523　*　2/2013　............. A61H 19/00

* cited by examiner

*Primary Examiner* — Hongmin Fan
(74) *Attorney, Agent, or Firm* — Payam Moradian

(57) ABSTRACT

Provided is a method for capturing feedback from one device and relaying it to another device, comprising: detecting the feedback based on one or both of the following: vibration in a haptic generating device with one or more sensors on a relay device, wherein the vibration is converted into an electrical signal; 3-dimensional movement of the haptic generating device, wherein the movement is converted into the electrical signal; transmitting the electrical signal to a target device using wireless communication; and actuating the target device, based on the electrical signal, to take an action that can be sensed by a user; wherein at least one of a frequency or an intensity of the action of the target device depends on a frequency or an intensity of the feedback. physically attaching the relay device to the haptic generating device.

19 Claims, 16 Drawing Sheets

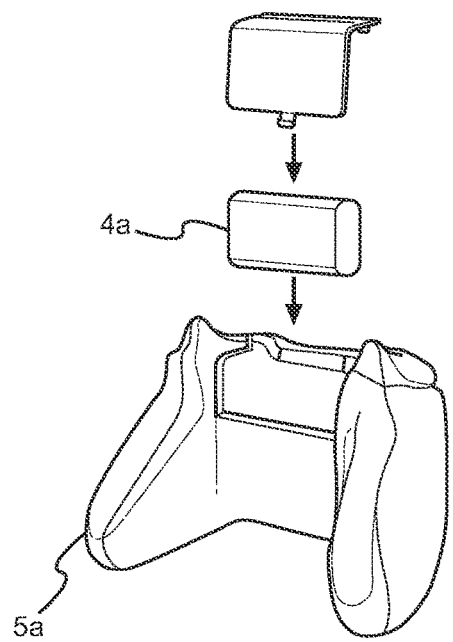
FIG. 3
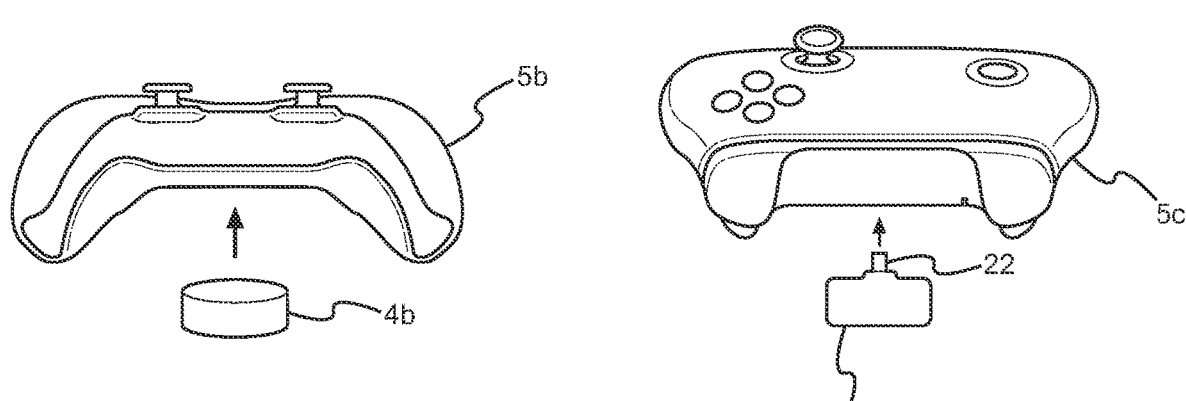
FIG. 4
FIG. 5

| DETECTED VIBRATION INTENSITY ON SOURCE DEVICE | CONFIGURABLE TRANSLATION INTENSITY FACTOR | SUCTION INTENSITY ON OUTPUT DEVICE |
|---|---|---|
| 1 | 1 | 1 |
| 1 | 2 | 2 |
| 1 | 3 | 3 |
| 5 | 1 | 5 |
| 5 | 1.5 | 7.5 |
| 5 | 2 | 10 |

FIG. 10

ACTIVATION FREQUENCY OF TARGET DEVICE BASED ON
SOURCE HAPTIC FEEDBACK

| DETECTED VIBRATION FREQUENCY ON SOURCE DEVICE (SECONDS) | CONFIGURABLE VIBRATION FREQUENCY FACTOR | VIBRATION FREQUENCY ON OUTPUT DEVICE (SECONDS) |
|---|---|---|
| 1 SECOND | 1 | 1 SECOND |
| 1 SECOND | 2 | 2 SECONDS |
| 1 SECOND | 3 | 3 SECONDS |
| 5 SECONDS | 1 | 5 SECONDS |
| 5 SECONDS | 1.5 | 7.5 SECONDS |
| 5 SECONDS | 2 | 10 SECONDS |

FIG. 11

| DETECTED VIBRATION INTENSITY ON SOURCE DEVICE | CONFIGURABLE INTENSITY FACTOR | VIBRATION INTENSITY ON OUTPUT DEVICE |
|---|---|---|
| 2 | 1 | 2 |
| 2 | 2 | 4 |
| 2 | 3 | 6 |
| 5 | 1 | 5 |
| 5 | 1.5 | 7.5 |
| 5 | 2 | 10 |

FIG. 12

FEEDBACK CAPTURE AND RELAY

CROSS-REFERENCE

The present application claims the benefit of provisional application No. 63/448,027, filed on Feb. 24, 2023, and 63/521,195, filed on Jun. 15, 2023, which are incorporated herein by reference.

BACKGROUND SECTION OF THE INVENTION

Some video games provide feedback to the end user, typically in the game controller, connected to the game console. The feedback, however, is lost shortly after it is provided. There is a need in the art to capture the feedback.

SUMMARY SECTION OF THE INVENTION

Provided is a method for capturing haptic feedback from one device and relaying it to another device, comprising: detecting the haptic feedback in form of vibration in a haptic generating device with one or more sensors on a relay device, wherein the haptic feedback is converted into an electrical signal; transmitting the electrical signal using wireless or wired communication; and receiving the electrical signal at a target device to actuate the target device to take an action that can be sensed by a user; wherein at least one of frequency or intensity of the action of the target device depends on the frequency or intensity of the haptic feedback. The method can include physically attaching the relay device to the haptic generating device. The relay device can be attached to a port of the haptic generating device. The haptic feedback can be detected with an accelerometer. Displacement sensors, velocity sensors, and microphone sensors can also be used. The haptic generating device can be a game controller. The method can include translating the haptic feedback in the form of vibration to different type of action. The different type of action can be suction. The different type of action can be TENS signal with TENS device. The action can be a vibration. The action can be thrust. The action can be stroke. Smart device receive and transmits the electrical signal from the relay device. The smart device can receive the electrical signal with a short-range wireless protocol configured to make communication in less than 100 meters and transmits the electrical signal to a cloud internet. The signal can be transmitted to a smart phone or a locally connected device, or the cloud internet. The smart device can receive and send the electrical signal with a short-range wireless protocol configured to make communication in less than 100 meters. The smart device can be configured to communicate with a plurality of action devices. The relay device can comprise a housing configured to be attached to haptic generating device, the one or more sensors configured to detect haptic feedback without direct electrical connection, and a wireless chip for transmitting the haptic feedback recorded by the sensor to another device. The signal can be communicated with Bluetooth or WiFi. The relay device can communicate the electrical signal to a smart device, the smart device further configured to communicate with the action device. The smart device can be configured to communicate with the action device, or with another smart device over a cloud internet. The relay device can also be configured to communicate directly with the action device.

Provided is a haptic relay device comprising: a housing configured to be attached to a game controller; a sensor configured to detect haptic feedback without direct electrical connection; and a wireless chip for transmitting the haptic feedback recorded by the sensor to another device.

Provided is a system for capturing haptic feedback from one device and relaying it to another device, comprising: a haptic relay device, comprising: one or more sensors configured to detect haptic feedback without a wired connection for carrying signal; a wireless chip for communicating the signal to another device, wherein the haptic relay device is configured to be physically attached to a haptic generating device; a device configured to vibrate in intensity or duration depending on the signal communicated by the haptic relay device.

Provided is a method for capturing feedback from one device and relaying it to another device, comprising: detecting the feedback based on one or both of the following: vibration in a haptic generating device with one or more sensors on a relay device, wherein the vibration is converted into an electrical signal; 3-dimensional movement of the haptic generating device, wherein the movement is converted into the electrical signal; transmitting the electrical signal to a target device using wireless communication; and actuating the target device, based on the electrical signal, to take an action that can be sensed by a user, wherein at least one of a frequency or an intensity of the action of the target device depends on a frequency or an intensity of the feedback. physically attaching the relay device to the haptic generating device.

Provided is a method for capturing feedback from one device and relaying it to another device, comprising: detecting the feedback based on one or both of the following: vibration in a haptic generating device with one or more sensors on a relay device, wherein the vibration is converted into an electrical signal; 3-dimensional movement of the haptic generating device, wherein the movement is converted into the electrical signal; transmitting the electrical signal to a target device using wireless communication; and actuating the target device, based on the electrical signal, to take an action that can be sensed by a user, wherein at least one of a frequency or an intensity of the action of the target device depends on a frequency or an intensity of the feedback.

Provided is a method for capturing positional feedback from one device and relaying it to another device, comprising: detecting 3-dimensional movement of the haptic generating device, wherein the movement is converted into an electrical signal; transmitting the electrical signal using wireless communication; and receiving the electrical signal at a target device to actuate the target device to take an action that can be sensed by a user; wherein at least one of frequency or intensity of the action of the target device depends on the frequency or intensity of the haptic feedback.

Provided is a method for capturing haptic feedback from one device and relaying it to another device, comprising: detecting the haptic feedback in form of an amperage of a current to a vibrating motor of the haptic generating device, determining an amount of haptic feedback based on the amperage; transmitting an electrical signal based on the determined amount using wireless or wired communication; and receiving the electrical signal at a target device to actuate the target device to take an action that can be sensed by a user; wherein at least one of frequency or intensity of the action of the target device depends on the frequency or intensity of the haptic feedback.

Provided is a system for capturing haptic feedback from one device and relaying it to another device, comprising: a current reader for detecting the haptic feedback in form of an amperage of a current to a vibrating motor of the haptic generating device and determining an amount of haptic feedback based on the amperage; a relay device for transmitting an electrical signal based on the determined amount using wireless or wired communication; and a target device for receiving the electrical signal to actuate the target device to take an action that can be sensed by a user; wherein at least one of frequency or intensity of the action of the target device depends on the frequency or intensity of the haptic feedback.

Provided is a system for capturing positional feedback from one device and relaying it to another device, comprising: an accelerometer for detecting 3-dimensional movement of the haptic generating device, wherein the movement is converted into an electrical signal; a relay device for transmitting the electrical signal using wireless communication; and a target device for receiving the electrical signal to actuate the target device to take an action that can be sensed by a user; wherein at least one of frequency or intensity of the action of the target device depends on the frequency or intensity of the positional feedback.

Provided is a system for capturing haptic feedback from one device and relaying it to another device, comprising: an accelerometer for detecting the haptic feedback based in form of vibration in a haptic generating device with one or more sensors on a relay device and converting the haptic feedback into an electrical signal; a relay device for transmitting the electrical signal using wireless communication; and a target device for receiving the electrical signal to actuate the target device to take an action that can be sensed by a user; wherein at least one of frequency or intensity of the action of the target device depends on the frequency or intensity of the haptic feedback.

BRIEF DESCRIPTION OF THE DRAWINGS

FIG. 3 illustrates attaching a relay device to a game controller.

FIG. 4 illustrates attaching a relay device to a game controller.

FIG. 5 illustrates attaching a relay device to a game controller.

FIG. 10 illustrates translation of signal received from vibration generating device and converting the action to suction based on the intensity of the signal that is received.

FIG. 11 illustrates the frequency of the signal received from vibration generating device outputted to the target device based on the original signal multiplied by a conversion factor.

FIG. 12 illustrates the intensity of the signal received from vibration generating device outputted to the target device based on the original signal multiplied by a conversion.

DETAILED DESCRIPTION OF THE INVENTION

Figure 1:
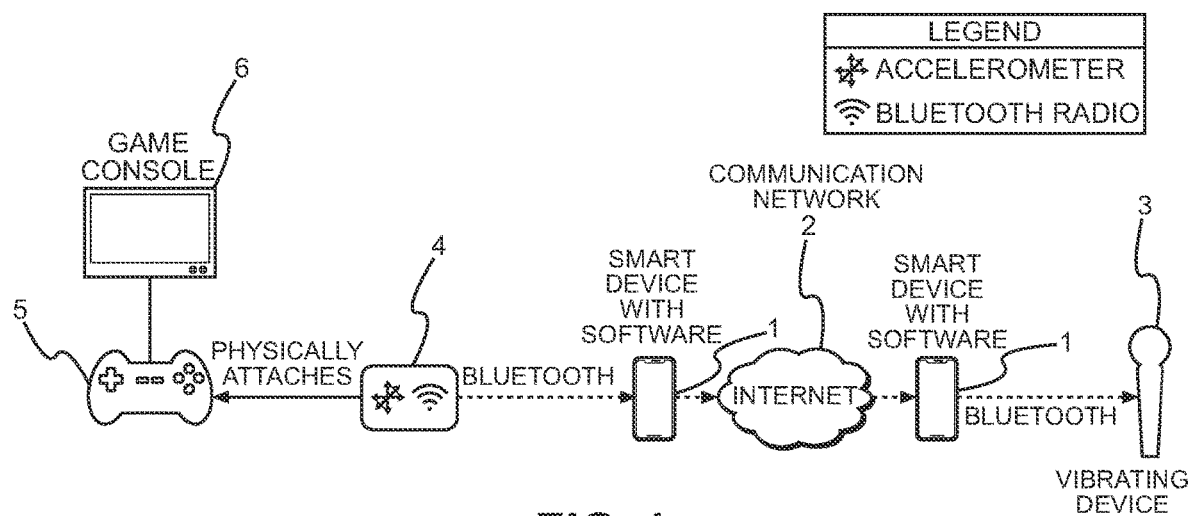
FIG. 1 illustrates capture and relay of haptic feedback between devices.

The present invention relates to a system, method, and device for capturing feedback from one device and relaying it to another device using indirect means.

In one embodiment, haptic feedback is captured and relayed. Haptic feedback, also known as force feedback or tactile feedback, is a technology that uses vibrations or other physical sensations to provide users with information about their interactions with electronic devices. Many devices, such as smartphones, gaming consoles, and wearable devices, are capable of providing haptic feedback to users. Haptic refers to the sense of touch.

The present invention provides a system and method for capturing haptic feedback from one device and relaying it to another device using indirect means (without a wired connection). The system includes a haptic generating device (often a game controller 5), and a haptic relay device 4 that is positioned to capture the haptic feedback.

The haptic relay device 4 includes one or more sensors that are capable of detecting haptic feedback, such as vibration or pressure, and converting it into an electrical signal. Typically, an accelerometer 85 is used to capture the haptic feedback. Displacement sensors, velocity sensors, and microphone sensors can also be used. A current reader 91 can also be used.

The haptic relay device 4 includes a transmitter that is capable of transmitting a signal to the target device using wireless or wired communication.

The system can be used in a variety of applications, such as remote-control devices, virtual reality environments, and gaming consoles 6. By using indirect means to capture and relay haptic feedback, the system provides a simple and efficient way to enhance the user's experience with electronic devices.

FIGS. 1, 2, 9, 13, 14, 21, and 22 illustrate the transfer of haptic feedback from one device to another. A user receives haptic feedback on a game controller 5. The game controller 5 can be in communication with a game console 6 or to the cloud. The relay device 4 physically attaches to the controller 5 and captures the haptic feedback from the controller 5. The relay device 4 can have a wireless chip (wireless processor 82) (such as Bluetooth 21®) for wireless transmission of the haptic feedback to another device. The haptic feedback can first be transferred to a smart device, such as a smart phone 1, smart watch, tablet computer, laptop or personal computer. The smart device such as smart phone 1 can then transfer the haptic feedback, such as with the internet (WIFI) to another device. As illustrated in FIG. 1, a vibrator 3 (depicted as a dildo sex device) ultimately receives the haptic feedback. Alternatively, the smart device (smart phone 1) communicates directly (without the need of another smart phone 1 after communication with the cloud) with the vibrator 3, with a wireless protocol such as Bluetooth 21®. Alternatively, the communication is with another vibrating controller 5 (kind of ride-along mode for gamers).

A game controller 5 is a handheld device with one or more of buttons, joysticks and or touchpads that allows a player to provide input to the game. A game controller can also give the player output in the form of haptic feedback or vibration, as the player interacts with the game. This haptic feedback is delivered by vibrating motors, inside the game controller. A game controller can be connected the console by wired connection or wireless connection. The game controller can also be integrated as part of the console form factor, in handheld gaming systems. For example, Nintendo Switch is a handheld game console with vibration motors and buttons all built into the screen and game console together, which also acts as a game controller. The term game controlled as used herein also includes game controller/console combinations like Nintendo Switch. In one embodiment, the console is less than 10 inches wide and has fewer that 15 buttons.

Figure 2:
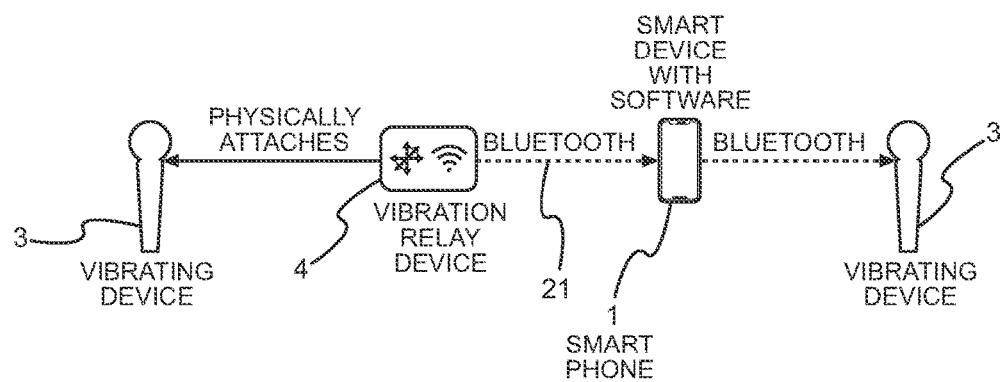
FIG. 2 illustrates capture and relay of haptic feedback between devices.
Figure 7:
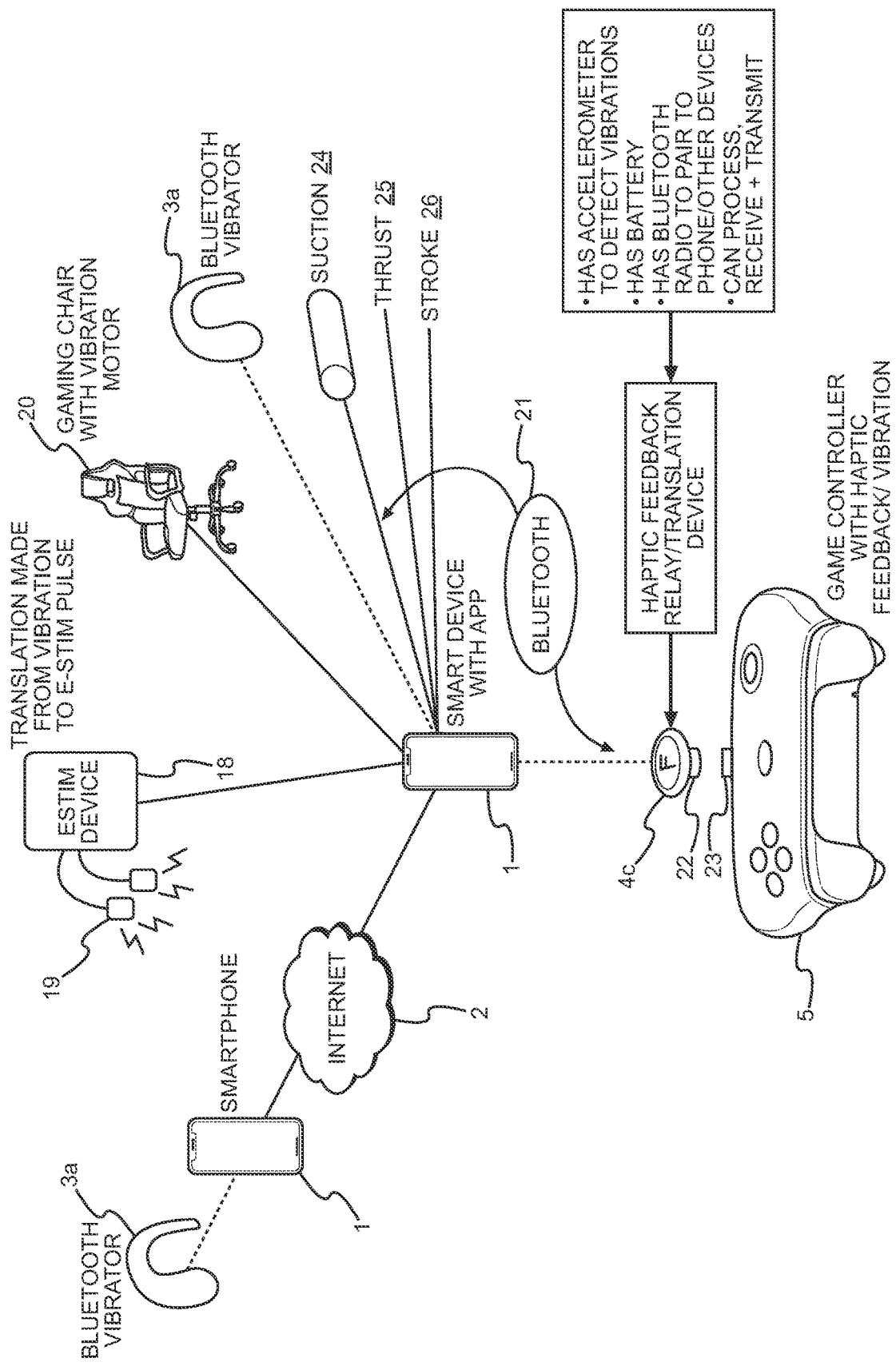
FIG. 7 illustrates capture and relay of haptic feedback between devices.

In FIGS. 1 and 7, the relay device 4 transfers a signal to the smart phone 1 having an application. The smart phone 1 then communicates the signal to another smart phone 1 through the cloud. The users of two smart phones 1 do not need to be in proximity to each other. The second smart phone 1 then transmits the signal to the vibrator with a wireless protocol. In FIG. 2, the smart phone 1 send a signal directly to the vibrator 3. The signal can also be sent to other devices, such as controller 5 used by another user. The signal can also be sent to a chair 20 or a Tens-unit (Transcutaneous electrical nerve stimulation) 18 sex device. Chair 20 can have a built-in vibrator and/or speaker.

The vibrator 3 (and other end user devices) mimics the vibration of the controller 5. Depending on the feedback the game player gets, the vibrator 3 will vibrate in the same manner. For example, if the game controller 5
vibrates when (or with more intensity) a character dies, the vibrator 3 will do the same. The intensity and/or duration of the vibration mimics the vibration pattern of the game controller 5, and can depend on the status of the game, character, getting points, losing points, getting new level or status, or losing new level or status, or speed, or picking up or losing items such as guns, gifts, ammunition, or a vehicle crash. Or when characters are fighting, shooting, inflicting damage, taking damage, or any actions in the game, that create haptic feedback. The haptic generating device can also be a vibrating dildo 3.

Figure 9:
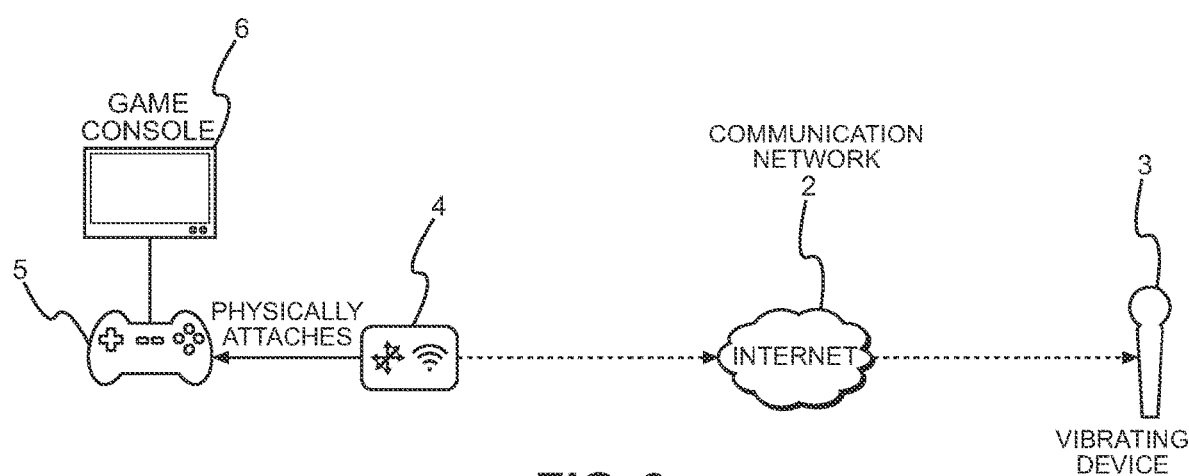
FIG. 9 illustrates the haptic relay device communicating directly with the cloud internet.

FIG. 9 illustrates direct communication between the haptic relay device 4 and the cloud internet 2. In the embodiment, the vibration or other haptic feedback in haptic relay device 4 is directly communicated to the cloud internet without the use of a smart phone.

The haptic relay device 4 communicates directly with vibrator 3.

Figure 13:
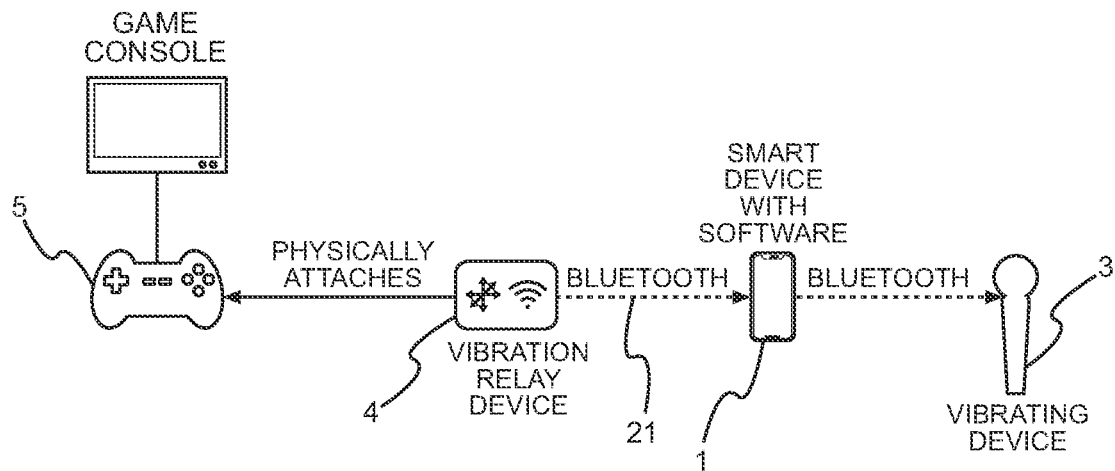
FIG. 13 illustrates transfer of a haptic signal from a game controller to a target device.

FIG. 13 illustrates communication between the haptic relay device 4 and smart phone 1 with a local connection, such as Bluetooth 21 WiFi, or RF (Radio Frequency). The embodiments illustrated with Bluetooth can be carried out with any radio frequency, including WiFi, or RF (Radio Frequency). In the embodiment, the vibration or other haptic feedback in haptic relay device 4 is directly communicated to the smart phone 1. The smart phone 1 communicates directly with vibrator 3 with a local connection, such as Bluetooth 21 or RF (Radio frequency).

Figure 14:
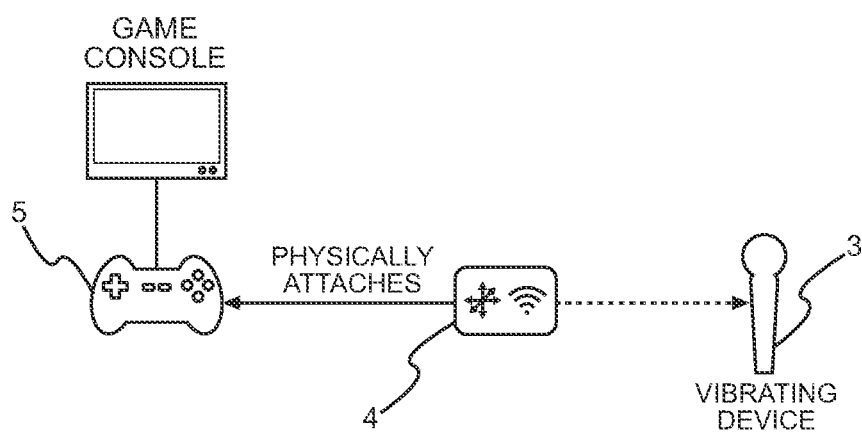
FIG. 14 illustrates transfer of a haptic signal from a game controller to a target device.

FIG. 14 illustrates communication between the haptic relay device 4 and vibrator 3 with a local connection, such as Bluetooth 21 or RF (Radio frequency). In the embodiment, the haptic relay device 4 itself can have an application that manipulates the signal that is sent to vibrator 3. A smart phone 1 is not used in this embodiment or is only used for the limited purpose of pairing. The connection between the two devices can be established through button presses on each device (Bluetooth 21 pairing), or the connection can be established by a smartphone application. After the smart phone 1 pairs the two devices 3, 5, it is no longer needed.

FIGS. 3, 4, and 5 illustrate various embodiments for attaching the relay device 4 to the controller 5. The relay device 4 can also be built into the controller 5. In one embodiment (FIG. 3), the relay device 4a is made+ to attach to the controller 5a with the use of pre-existing slots, such as those used to attach a cover for the battery compartment. The relay device can be used instead of the battery cover as well. In another embodiment (FIG. 4), the relay device 4b can be attached, such as with an adhesive or a clip or by having a form fitting design, to the controller 5b, such as on the bottom of the controller 5b. Another option (FIG. 5) is to physically attach the relay device 4c to the controller 5c through the charging or non-charging port (USB-C, micro USB, proprietary power port) as a way to give it a stable place to attach. In one embodiment, the relay device's 4c battery can be charged through attachment to a port though a charging port 22.

Figure 6:
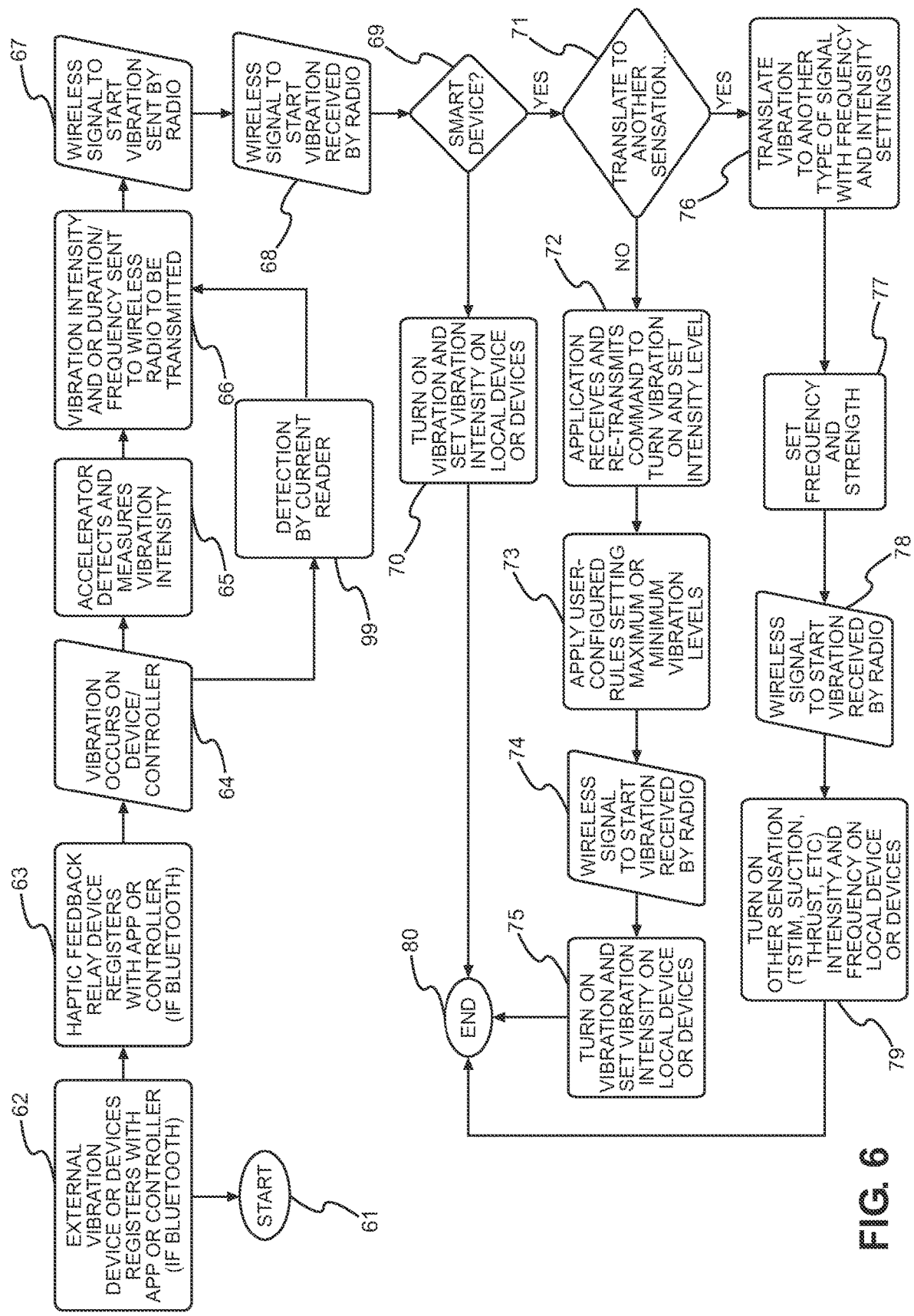
FIG. 6 illustrates a flowchart for capturing and transferring and/or translating haptic feedback.

FIG. 6 illustrates a software flow chart. To start 61, a user can register an external vibration device 62 and the haptic feedback relay device 63. Vibration then occurs on controller 5 or another device 64. The accelerometer 85 or another sensor detects the vibration intensity 65. The vibration intensity and or duration/frequency is sent to be transmitted 66. Alternatively, detection can be carried out 99 by a current reader that is attached in series to the vibrating motor of the controller 5. Wireless signal to start vibration is sent 67 and received 63. If the signal is sent directly to a vibrator or another vibrating device 70, the device starts vibrating. If the signal is sent to a smart phone 1 (yes to 69), the smart phone 1 may or may not translate the signal 71. If the signal is not translated, the application receives and transmits command to turn vibration on and set intensity level 72. The application can apply user-configured rules to set maximum and minimum vibration levels 73. A wireless signal is then sent and received to start vibration 74. The local device such as an end user vibrator 3 is then turned on and the vibration intensity is set on a local device 75 to reach the end 80. In another embodiment the signal that is received by the smart device is translated (yes to 71) into another type of signal with frequency and intensity settings 76. The frequency and the strength can be set 77, and a wireless signal can be sent to the vibrating device 78, and other sensations can be turned on 79. Examples of translated sensations include TSTIM (Tens Stimulation), suction and thrust.

The vibration happens on a controller 5 of a game console 6, for example an X-BOX, PLAYSTATION, or NINTENDO handheld gaming device. The initial vibration can also happen in sex device such as vibrator 3. A relay device 4 is attached physically to the controller 5 in such configuration that vibration from the controller 5 moves, through physical contact, to the relay device 4. A sensor in the relay device 4, such as an accelerometer 85, can be used to detect 8 the vibration and movement in the controller 5. Vibration intensity and/or duration 9 can be measured with the accelerometer 85 or another sensor.

The relay device 4 can then communicate the vibration intensity and/or duration 9 with a wireless protocol, such as WiFi or Bluetooth 21. The wireless communication can be done with a smart device, such as smart phone 1. Alternatively, the target device, such as a sex device, such as a dildo and/or a vibrator 3 can receive the signal, or another vibrating controller 5 (kind of ride-along mode for gamers). The target device can also be a sex machine with a moving vibrator 3 (dildo) that vibrates or gains speed.

In the embodiments where a vibrator 3 (dildo) is used, any sexual stimulation device, therapeutic massage device, or vibrating haptic feedback device can also be used. Sexual Stimulation Device includes vibrators, insertable, wearable, and basically any sex toy that vibrates. It would also include the other physical stimuli, like suction, thrusting, and estim. Therapeutic massage device can encompass any products that fall into the category of therapeutic (not specifically sexual) devices. Vibrating Haptic Feedback Device would include gaming vests, bracelets, and chairs.

The wires signal is received by the wireless chip processor and transmitted. When the smart phone 1 receives the signal, the signal can be further manipulated by the user or be set by the smart device. The application on the smart phone 1 can receive the signal, and transmit command to turn on vibrator 3 and set intensity level. A user can set control as to maximum and minimum vibration levels. The signal then can be transmitted to the target device with wireless transmission, such as Bluetooth 21 or WiFi.

In another embodiment, the received signal and the transmitted signal create actions that are different in kind. For example, a received signal regarding a vibration is converted (translated) to a suction (suction device 24) or a TENS ((Transcuteneous electrical nerve stimulation) with TENS device 18) signal which corresponds in intensity and/or duration to the vibration signal that is received. The signal can also be sent to a thrust device 25 or a stroke device 26. The signal can be sent by relay device 4 or smartphone 1 to multiple devices. The signal can be sent to the same kind of action devices or different kinds of action devices at the same time.

FIG. 7 illustrates communication between the devices of the system. Relay device 4c with port 22 is removably attached to port 23 of controller 5. Signal from relay device 4e is communicated with wireless protocol, in this case Bluetooth 21, to smart phone 1. The smart phone 1 has an application that is configured to receive and process the signal, and communicate the signal to the next device. The application can detect the intensity and/or frequency of the signal, and then transmit a signal to the next device, which can include Bluetooth 21 vibrator 3a, Estimation device 18 (with electrical endings 19), gaming chair with vibration motor 20, suction generator device 24, thrust generator device 25, and stroke generator device 26. The connection can be direct from smart phone 1 or through internet 2.

FIG. 10 illustrates translation of signal received from vibration generating device and converting the action to suction based on the intensity of the signal that is received. FIG. 11 illustrates the frequency of the signal received from vibration generating device outputted to the target device based on the original signal multiplied by a conversion factor. FIG. 12 illustrates the intensity of the signal received from vibration generating device outputted to the target device based on the original signal multiplied by a conversion factor. The frequency and/or intensity of the action of the target device depends on the frequency or intensity of the haptic feedback. The frequency and/or intensity is multiplied by a factor to increase, decrease, or maintain the same frequency and/or intensity. The application on the smart phone 1 can further have limits for maximum and minimum frequency and/or intensity. The factor can be from 0.1 to 10.

Another embodiment provides utilizing accelerometer data for dynamic positional feedback. This functionality capitalizes on the accelerometer's 85 (which can also be incorporated in controller 5) data output. This allows users to interact with connected devices in a nuanced manner by interpreting positional and movement data.

Figure 25:
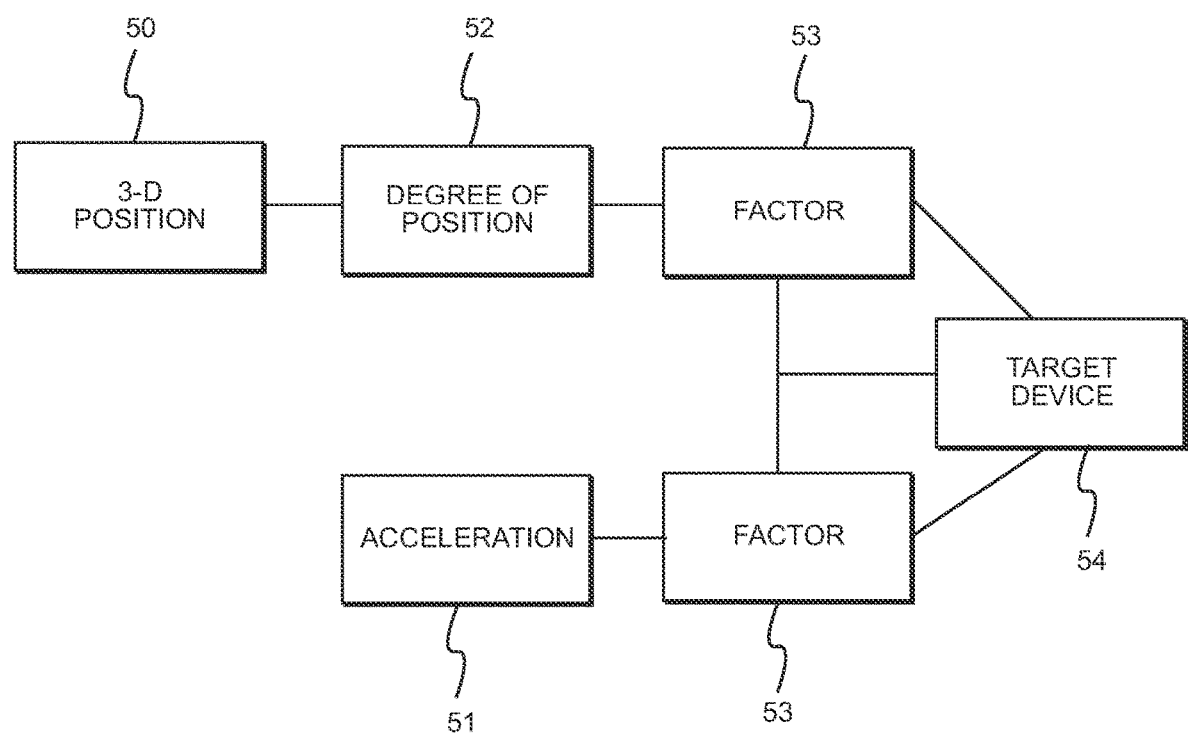
FIG. 25 illustrates the relaying of data based on 3-D position and acceleration.

The accelerometer 85 (which can also be incorporated in controller 5) provides a comprehensive data stream that extends beyond raw vibration signals. Its data includes precise positional information, allowing us to accurately ascertain the orientation of the device in three-dimensional space. FIG. 25 illustrates the accelerometer detecting acceleration 51 and 3-D position 50. The accelerometer calculates the degree of position 52 and the amount of acceleration 51. The data can be multiplied by a factor 53 to increase, keep the same, or increase the intensity of the action at the target device 54. The 3-D position and the acceleration data can be combined together, or used separately to actuate the target device 54.

Leveraging the detected positional changes, the system facilitates user-initiated control over connected vibration devices through distinct responses; 1) Elevation Control: By tilting the controller 5 upwards (toward the upper region, above 0 degrees), the system detects this shift in elevation and adjusts the connected vibration device accordingly, increasing vibration intensity. 2) Descent Adjustment: Conversely, tilting the controller 5 downwards (below 0 degrees) triggers a reduction in vibration intensity of the connected device. 3) Lateral Interaction: Horizontal tilting (right or left) enables users to seamlessly cycle through predefined vibration patterns.

The integration of accelerometer-derived positional feedback bridges the gap between user actions and responsive device behavior, resulting in an immersive user experience across applications. The positional feedback functionality seamlessly coexists with the core indirect haptic Capture and relay feature, allowing users to transition between enhanced positional interactions and the original haptic feedback capture and relay. The haptic capture and positional capture can be done individually or together.

The accelerometer provides X. Y and Z positional data that is detected and used to determine vibration intensity, frequency, and/or pattern.

| Detected Motion Change on Relay Device Accelerometer | Vibration Intensity, Frequency or Pattern on Output Device |
|---|---|
| X, Y, Z values change by 10% | Set vibration intensity to 3, set frequency to 5 seconds, set pattern to pulse pattern |
| X, Y, Z values change by 20% | Set vibration intensity to 5, set frequency to 5 seconds, set pattern to steady vibration pattern |
| X, Y, Z values change by 50% | Set vibration intensity to 10, set frequency to 10 seconds, set pattern to custom vibration pattern |

Figure 15:
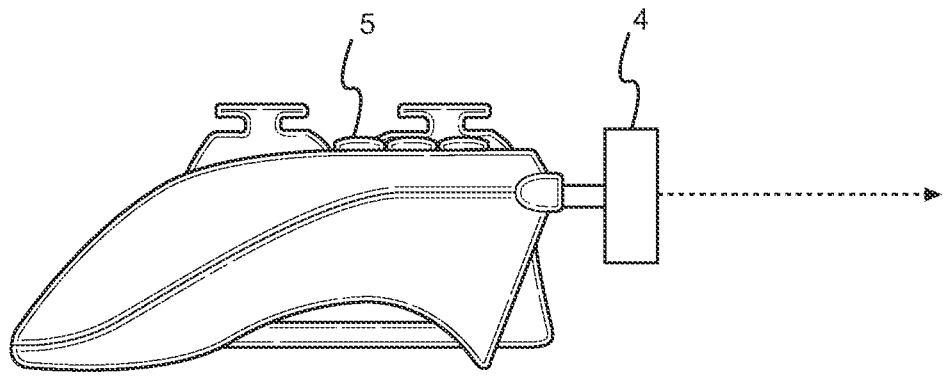
FIG. 15 illustrates neutral vertical position of the controller with zero degrees alignment.
Figure 16:
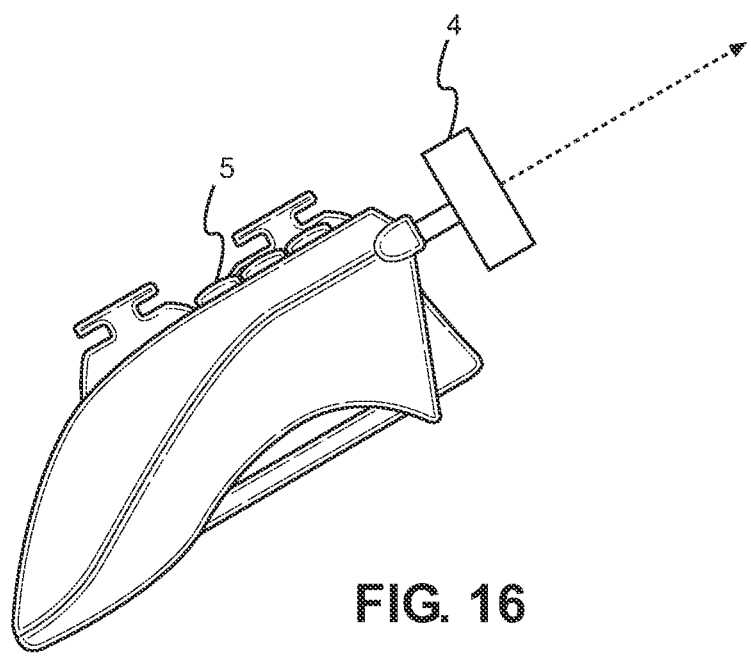
FIG. 16 illustrates upwardly vertical movement of 30 degrees of the controller.
Figure 17:
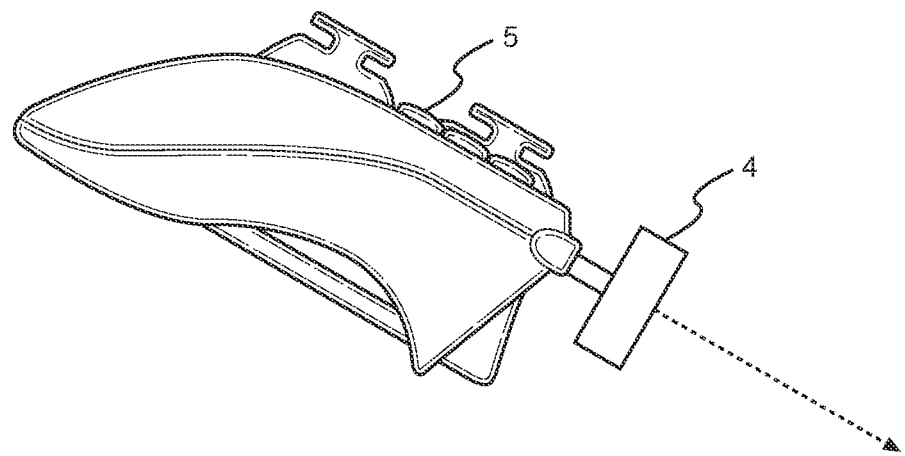
FIG. 17 illustrates downwardly vertical movement of 30 (negative thirty) degrees of the controller.
Figure 18:
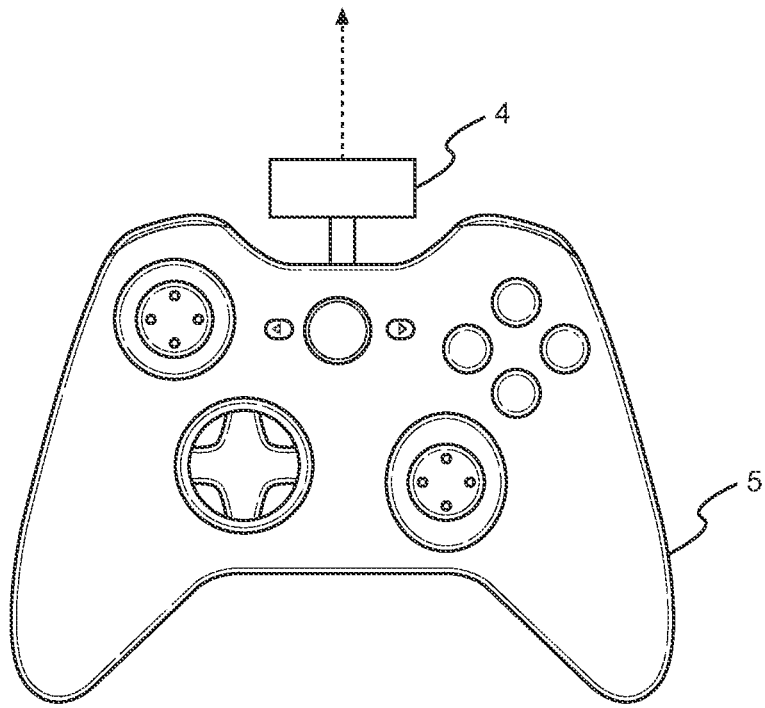
FIG. 18 illustrates neutral horizontal position of the controller with zero degrees alignment.
Figure 19:
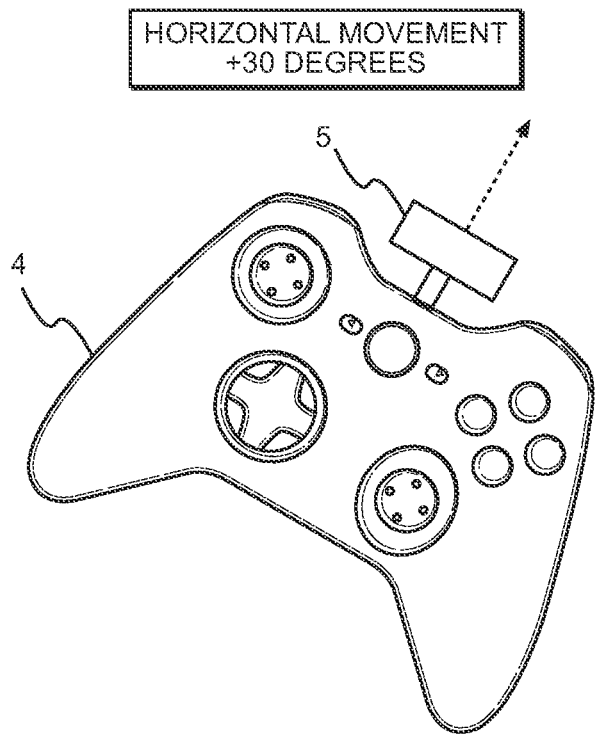
FIG. 19 illustrates horizontal movement of positive 30 degrees (to the right) of the controller.
Figure 20:
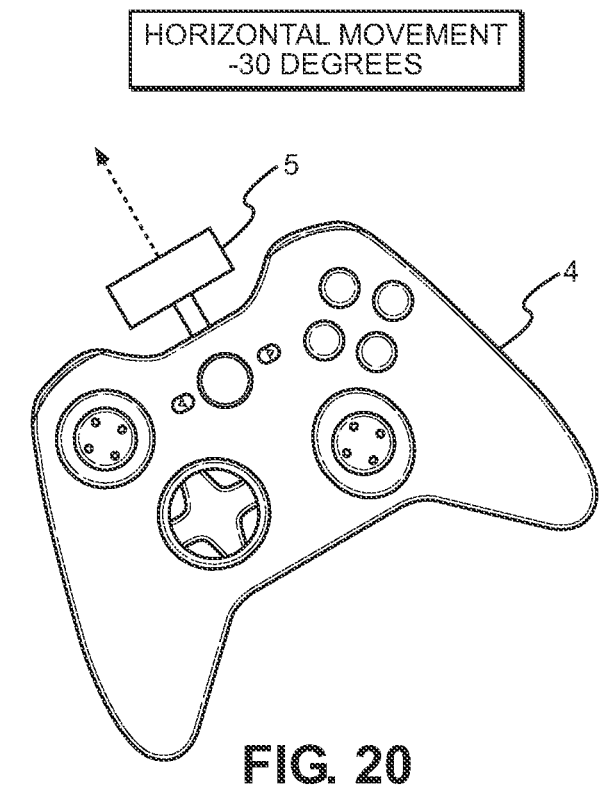
FIG. 20 illustrates horizontal movement of negative 30 degrees (to the left) of the controller.

FIG. 15 illustrates neutral vertical position of the controller 5 with zero degrees alignment. FIG. 16 illustrates upwardly vertical movement of 30 degrees of the controller 5. FIG. 17 illustrates downwardly vertical movement of 30 degrees of the controller 5. FIG. 18 illustrates neutral horizontal position of the controller with zero degrees alignment. FIG. 19 illustrates horizontal movement of positive 30 degrees (to the right) of the controller 5. FIG. 20 illustrates horizontal movement of negative 30 degrees (to the left) of the controller 5.

As the degree of orientation of the controller 5 increases either in vertical or horizontal position, the accelerometer detects the movement and the vibration increases. The vibration could be a result of additive movement in horizontal and vertical planes. The vibration could also synergistic in nature, which increases exponentially with additional movement.

Figure 21:
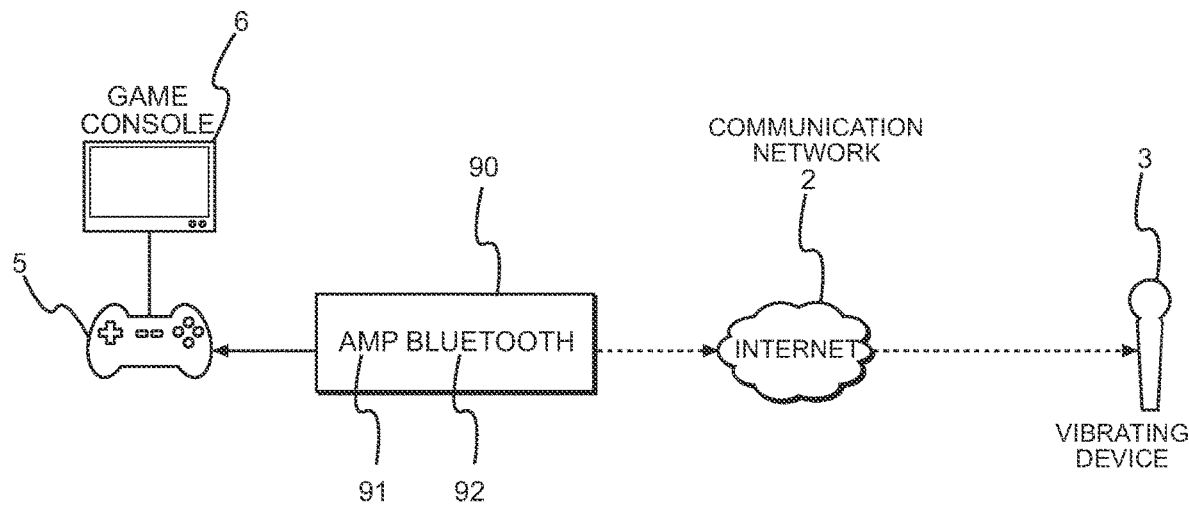
FIG. 21 illustrates an amp (ampere) reader (electrical current sensor/reader/meter).

FIG. 21 illustrates an amp (ampere or current) reader 91 (with an electrical current sensor), which can be placed in housing 90. The housing 90 can include both an ampere reader 91 and a wireless chip 92 (Bluetooth 21 as illustrated). The alternative method of detecting a real time haptic feedback level from a gaming controller is to build the relay device to position a sensor that goes around the controller handles where the vibration motors are, inside the controller, to detect amperage that the controller applies to the haptic feedback vibration motor in the controller 5. Detect controller haptic feedback level, then pass it along to actuate wireless or Bluetooth 21 connected device or pass to app, that actuates wireless or Bluetooth 21 connected device. A current meter can detect amperage externally to the controller 5.

In parallel to other methods, an alternative approach for calculating controller, haptic feedback intensity can be used. This method employs amperage-based detection, utilizing an external sensor affixed to the game controller. By monitoring the amperage drawn by the controller's 5 haptic motor 93, the system derives a direct measure of vibration intensity. This measurement serves as a foundation for replicating the controller's 5 haptic feedback, so that it can be passed along to connected wireless or Bluetooth 21 devices, or to an intermediary application, that then passes the signal along to actuate a device.

The primary approach to calculating controller intensity involves a vibration sensor that captures haptic feedback from the game controller 5. This feedback is converted into an electrical signal, transmitted wirelessly or via Bluetooth 21 to actuate a target device, generating corresponding haptic sensations.

Figure 23:
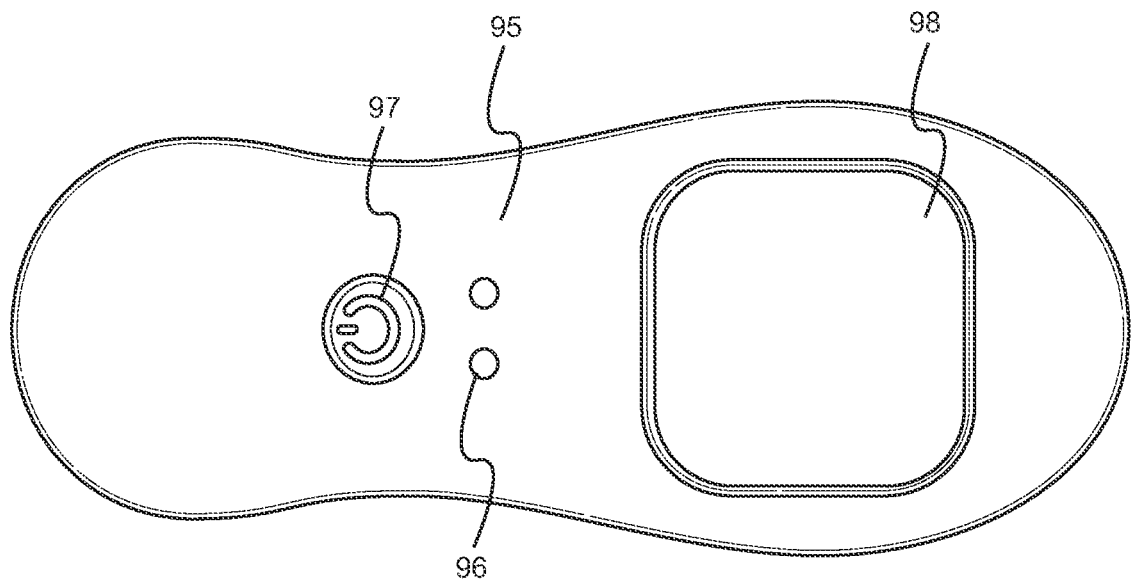
FIG. 23 illustrates a dildo (target device vibrator) having two parts, configured to be attached to an item of clothing.
Figure 24:
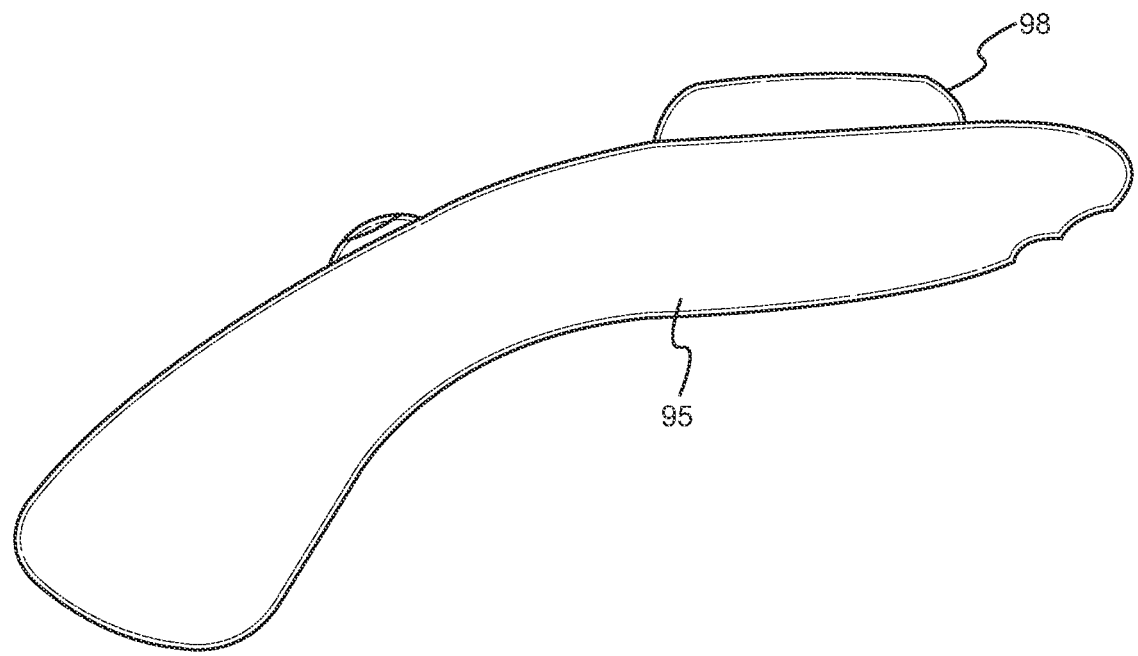
FIG. 24 illustrates a dildo (target device vibrator) having two parts, configured to be attached to an item of clothing.

In this alternative approach, a sensor attaches externally to the game controller 5. This sensor detects the amperage consumed by the controller's haptic motor 93, which closely correlates with vibration intensity. The power can come from a rechargeable battery 94. The FIGS. 23 and 24 illustrate a dildo (sex toy) 95 having two parts, configured to be attached to an item of clothing. The sex toy can have a member 98 that attaches to the main body of the dildo 98 to be attached to an item of clothing. The dildo 95 can have a power button 97, and a charging port 96.

Figure 22:
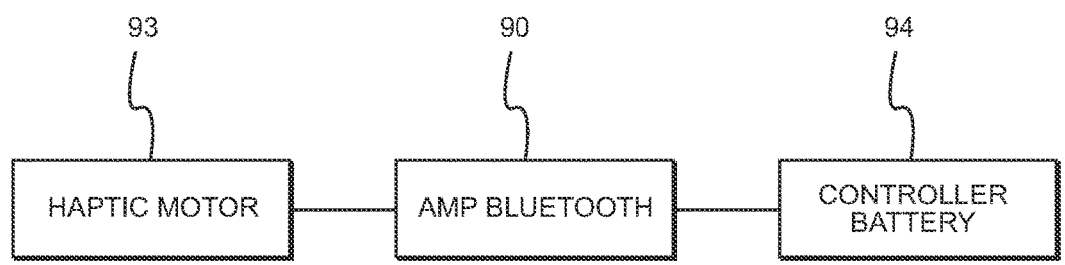
FIG. 22 illustrates measuring the current level with a series connection.

The amperage data acquired from the external sensor is translated into an electrical signal. This signal traverses the established path of our primary intensity calculation approach, reaching the target device for haptic reproduction. The outcome mirrors the original vibration intensity of the game controller. FIG. 22 illustrates measuring the current from rechargeable battery 94 to haptic motor 93 with an amp reader 91.

As an alternative route to calculating controller intensity, our amperage-based detection method introduces a new level of precision. By monitoring amperage drawn by the controller's haptic motor, the system extracts an authentic measure of vibration intensity. This enriches the sensory engagement across applications by ensuring accurate replication of the game controller's haptic feedback on connected devices.

The system reads amperage going from within the controller 5. There is a board with wiring inside the controller that connects small vibration motors inside the controller. The system reads the amperage going from the circuit board to the haptic feedback vibration motor inside the controller 5.

Figure 8:
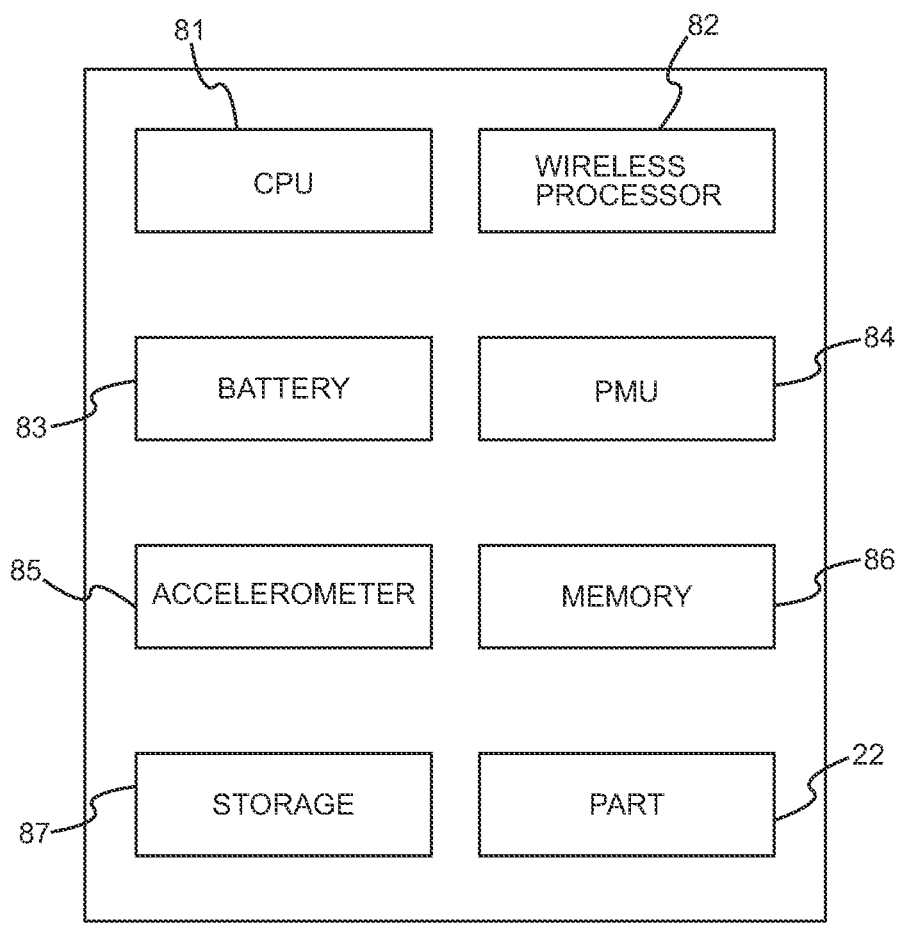
FIG. 8 illustrates various parts of the relay device.

FIG. 8 illustrates various parts of the relay device. Included in this figure are CPU (Central processing Unit) 81, wireless processor 82, battery 83, PMU (power Management Unit) 84, Accelerometer 85, memory 86, storage 87, and port 22.

The relay device can have a volatile memory (e.g., random access memory (RAM)), a non-volatile memory (e.g., read-only memory (ROM) or electrically-erasable programmable ROM (EEPROM))86, and a data storage 87, which may communicate with each other via a bus.

The relay device can have a processor 81. Processing devices may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, an application specific integrated circuit (ASIC), a field programmable gate array (FPGA), a digital signal processor (DSP), or a network processor).

The relay device may further include a video display unit (e.g., an LCD), an alphanumeric input device (e.g., a keyboard), a cursor control device (e.g., a mouse), and a signal generation device.

The relay device may have a data storage 87 device that may include a non-transitory computer-readable storage medium on which instructions may be stored encoding any one or more of the methods or functions described herein, including instructions for haptic recording and transmission.

The relay device can have an accelerometer 85, a rechargeable battery 83, and chips for wireless communication 82. The relay device can also have a housing that is configured to be attached to a game controller.

While a computer-readable storage medium is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components or in computer programs.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods and and/or each of their individual functions, routines, subroutines, or operations. Examples of the structure for a variety of these systems are set forth in the description above.

What is claimed is:

1. A method for capturing feedback from one device and relaying it to another device, comprising:
    detecting the feedback based on one or both of the following:
    a) vibration in a haptic generating device with one or more sensors on a relay device, wherein the vibration is converted into an electrical signal;
    b) 3-dimensional movement of the haptic generating device, wherein the 3-dimensional movement is converted into an electrical signal;
    transmitting the electrical signal to a target device using wireless communication; and actuating the target device, based on the electrical signal, to take an action that can be sensed by a user; wherein at least one of a frequency or an intensity of the action of the target device depends on a frequency or an intensity of the feedback;
    wherein at least one of a frequency or an intensity of the action of the target device depends on a frequency or an intensity of the haptic feedback;
    further comprising translating the vibration or the 3-dimensional movement to a different type of action.

2. The method of claim 1, further comprising physically attaching the relay device to the haptic generating device.

3. The method of claim 2, wherein the relay device is attached to a port of the haptic generating device.

4. The method of claim 1, wherein the vibration and the 3-dimensional movement are detected with an accelerometer.

5. The method of claim 1, wherein the haptic generating device is a game controller.

6. The method of claim 1, wherein the different type of action is suction.

7. The method of claim 1, wherein the transmitting of the electrical signal is done directly to the target device without use of an intervening device.

8. The method of claim 1, wherein the different type of action is TENS signal, vibration, thrust, or stroke.

9. The method of claim 1, wherein a smart device receives and transmits the electrical signal from the relay device.

10. The method of claim 9, wherein a smart device receives the electrical signal with a short-range wireless protocol configured to make communication in less than 100 meters and transmits the electrical signal to a cloud internet.

11. The method of claim 1, wherein a smart device receives and sends the electrical signal with a short-range wireless protocol configured to make communication in less than 100 meters.

12. The method of claim 1, wherein the relay device comprises a housing configured to be attached to haptic generating device, the one or more sensors configured to detect haptic feedback without direct electrical connection, and a wireless chip for transmitting the haptic feedback recorded by the sensor to another device.

13. The method of claim 12, wherein the relay device communicates the electrical signal to the target device, to a smart device or directly to a cloud internet.

14. The method of claim 12, wherein the smart device is configured to communicate with a plurality of action devices.

15. The method of claim 12, wherein the haptic generating device is a vibrating dildo.

16. The method of claim 1, wherein the target device is a two part dildo, with one part of the dildo configured to keep clothing in place.

17. A method for capturing haptic feedback from one device and relaying it to another device, comprising:
    a) detecting the haptic feedback based on an amperage of a current to a vibrating motor of a haptic generating device,
    b) determining an amount of the haptic feedback based on the amperage;
    c) transmitting an electrical signal to a target device based on the determined amount using wireless or wired communication; and
    d) actuating the target device, based on the electrical signal, to take an action that can be sensed by a user;
    wherein at least one of a frequency or an intensity of the action of the target device depends on a frequency or an intensity of the haptic feedback.

18. The method of claim 17, wherein the amperage is measured by a device having an ampere meter and a wireless chip in a single housing.

19. A method for capturing positional feedback from one device and relaying it to another device, comprising:
    detecting 3-dimensional movement of a haptic generating device, wherein the 3-dimensional movement is converted into an electrical signal;
    transmitting the electrical signal to a target device using wireless communication; and
    actuating the target device, based on the electrical signal, to take an action that can be sensed by a user,
    wherein the target device is a two part dildo, with one part of the dildo configured to keep clothing in place;
    wherein at least one of a frequency or an intensity of the action of the target device depends on a frequency or an intensity of the positional feedback.

* * * * *